W. L. BLISS.
DRIVING MECHANISM FOR GENERATORS.
APPLICATION FILED MAY 2, 1910.
1,025,506.
Patented May 7, 1912.
2 SHEETS—SHEET 1.
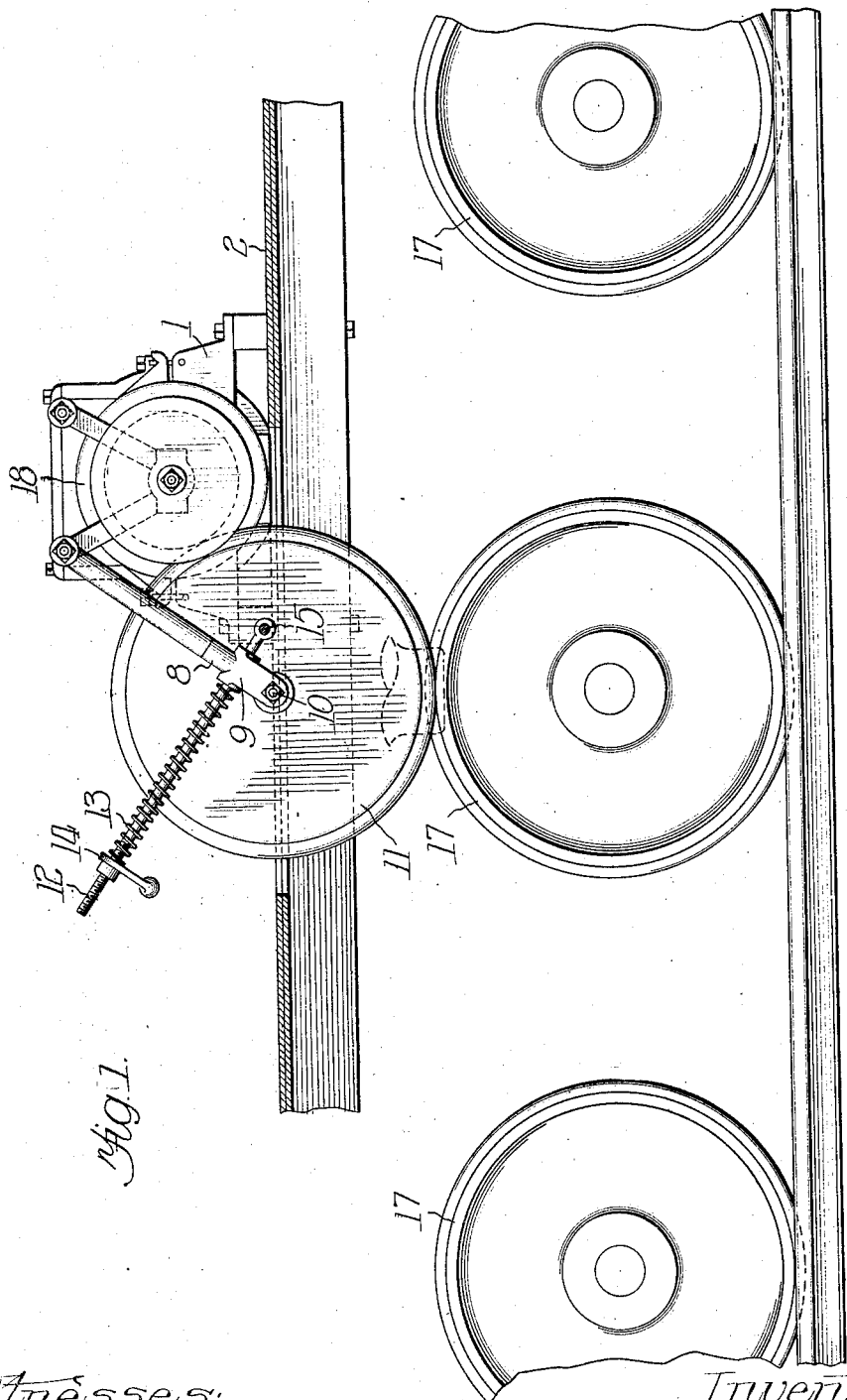

W. L. BLISS.
DRIVING MECHANISM FOR GENERATORS.
APPLICATION FILED MAY 2, 1910.
1,025,506.
Patented May 7, 1912.
2 SHEETS—SHEET 2.
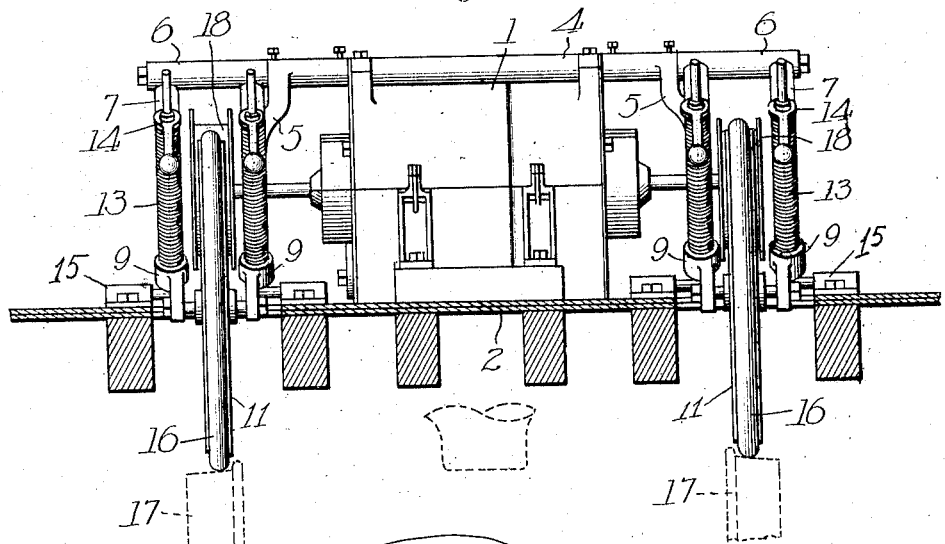
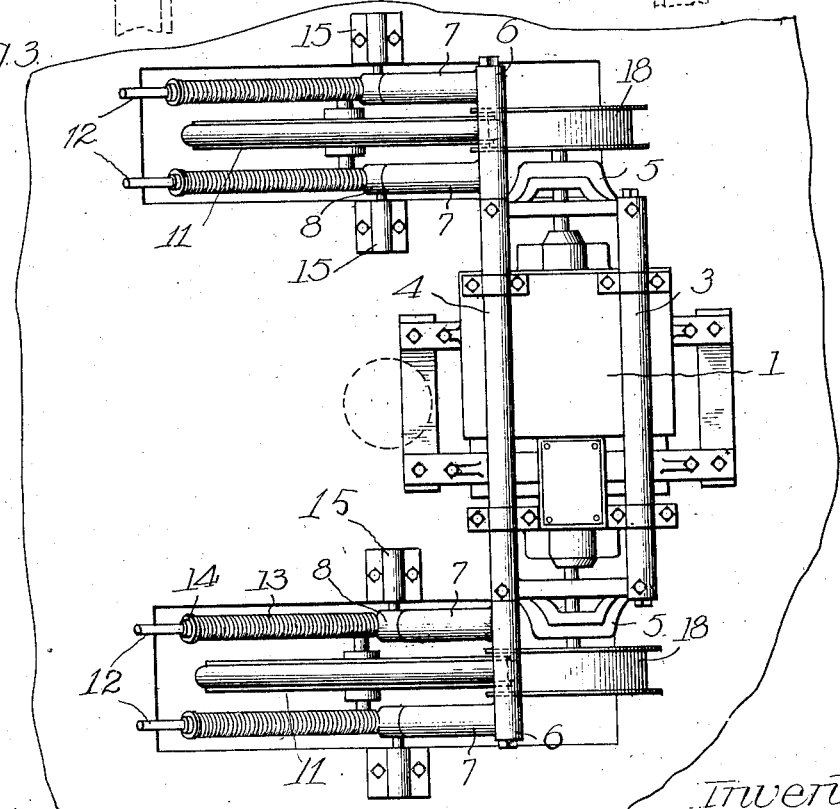
Witnesses:
Robert H. Weir
Geo. B. Jones
Inventor:
William L. Bliss
By: Edwin B. H. Tower Jr.
Atty.

UNITED STATES PATENT OFFICE.

WILLIAM L. BLISS, OF MILWAUKEE, WISCONSIN, ASSIGNOR TO THE UNITED STATES LIGHT & HEATING COMPANY, OF NEW YORK, N. Y., A CORPORATION OF MAINE.

DRIVING MECHANISM FOR GENERATORS.

1,025,506.  Specification of Letters Patent.  Patented May 7, 1912.

Application filed May 2, 1910. Serial No. 559,016.

*To all whom it may concern:*

Be it known that I, WILLIAM L. BLISS, a citizen of the United States, residing at Milwaukee, in the county of Milwaukee and State of Wisconsin, have invented new and useful Improvements in Driving Mechanism for Generators, of which the following is a full, clear, concise, and exact description, reference being had to the accompanying drawing, forming a part of this specification.

My invention relates to a friction drive for a generator and while it is adapted for general use, it applies particularly to that class of generators used in car lighting systems and deriving their power from the truck of the car in which they are mounted. Various driving arrangements have been adopted in the past, the most common being to mount the generator on the car truck and drive it by a belt from a pulley made in two halves and clamped to one of the car axles. Another method has been to drive the truck mounted generator by gears from one of the axles. Another has been to mount the generator in the body of the car and drive it by a belt from one of the axles.

The object of this invention is to provide practical and efficient friction means for driving the generator directly from the car wheels, thus dispensing with the customary pulley or gear, and taking advantage of the fact that the car wheels are of large diameter and reach nearly to the body of the car, so that but little intermediate mechanism is required to transmit power from the rim of the wheel to the generator on the floor of the car.

While power may be transmitted from a car wheel, to a generator located above said wheel, in a number of ways, I have illustrated in the drawings, a convenient and practical method of embodying the broad idea of my invention, in which drawings:—

Figure 1 is a side elevation of the generator, part of the car truck and intermediate driving mechanism. Fig. 2 is a front elevation thereof. Fig. 3 is a plan view.

Referring to the drawings, a generator 1, of any suitable construction is shown secured to the floor of the car 2, although it may of course be secured to any special mounting, if desired, the object of securing the generator directly to the floor of the car, being to reduce to the minimum, the distance between the generator and the car wheels.

While the generator may be of any desired construction, the preferred form illustrated has two rods or bars 3 and 4 secured to the top thereof and extending beyond the ends, as seen in Figs. 2 and 3. These bars 3 and 4, have mounted on each end, an auxiliary bearing 5 to support the generator axle. The rod 4 has also mounted thereon at each end, the bracket 6, having hollow extending arms 7—7. Each of the arms receives the member 8, thus forming a telescoping connection. The rod or member 8, carries a guide block 9, having a portion 10 which acts as a bearing for the friction wheel 11. In the guide block 9 is slidably mounted bar 12, adapted to move in a line at right angles to the telescoping support 8, although the angle between these members may be altered if desired. A coil spring 13 abuts against the guide 9 at one end and the adjustable stop 14 at the other end, and normally tends to move said guide block 9 away from the stop 14. The end of the rod 12, is pivotally secured in the bearings 15, which may be mounted on the floor of the car 2, or in any other suitable manner.

The friction wheel 11 is shown in the preferred form as provided with a suitable tire 16, which may be either pneumatic or solid, and which tire bears directly on the top of one of the car wheels 17, and also against the double flanged driving pulley 18, the pressure upon the driving and driven wheels, and consequently the friction, being substantially the same, since the friction wheel 11 is moved along a line which practically bisects the angle made by the axles of the three wheels.

From the foregoing, it will be apparent that the spring 13 forces the block 9 toward the pivot 15, thus maintaining sufficient pressure upon the driving and driven wheels to avoid slipping, and at the same time the block 9 and bearing 10 of the wheel 11, are pivotally movable about the support 15 to permit variations in distance between the generator and the car wheel 17, due to a slight up and down motion of the car body upon its springs. The telescoping members 7 and 8 permit of this motion while maintaining the alinement of the parts.

From an inspection of Fig. 1, it will be seen that the generator is not mounted directly above the driving wheel, but is located a slight distance to one side. The friction wheels however, are mounted directly over the middle wheels of the six wheel truck illustrated, as the truck swivels about a king pin (shown in dotted outline) mounted above the center of the axle of the middle wheels, in a well known manner. As a result of this mounting, there is only a slight twisting of the driving wheel with reference to the generator and friction wheel when the train is rounding a sharp curve. On such a curve, the friction wheel on one side has its point of contact with the driving wheel moved very slightly downward and to the rear, and on the other side moved very slightly downward and forward, the telescoping members and the pivoted spring connection permitting this slight variation.

While in the above description I have referred to certain embodiments of the principle of my invention, I do not limit myself to specific details of construction, but desire to include broadly, any practical means for accomplishing the desired result and coming within the scope of the appended claims.

Having described my invention, what I claim and desire to secure by Letters Patent of the United States, is:—

1. In combination, a generator, a vehicle wheel angularly movable in respect to said generator and a friction wheel directly intermediate said generator and wheel and in operative relation thereto in all positions.

2. In a generator driving mechanism, a generator, a frame mounted thereon, a driving wheel, a friction wheel mounted within said frame, and means to maintain said friction wheel in active engagement between said generator and said driving wheel.

3. The combination with a car frame, of wheels beneath the same, a generator mounted on said frame, a driving pulley on the shaft of said generator, a friction wheel bearing on the rim of one of said car wheels and also on the rim of said pulley, bearings for said friction wheel mounted in a swinging frame for forcing said friction wheel between said car wheel and pulley, whereby good frictional contact is maintained.

4. In a generator driving mechanism, the combination with a generator having a casing, of a frame pivoted thereto, said frame comprising telescoping members having a friction wheel mounted thereon, spring means coöperating with one of said telescoping members and a fixed support, to impel said friction wheel in a given direction, a pulley on the generator shaft and a driving wheel, both adjacent said pulley, to resist the thrust of said spring-impelled wheel, whereby frictional contact is maintained.

5. In combination, a generator mounted in a car over the car truck, a driving pulley for said generator, a wheel intermediate said pulley and one of the car wheels, said wheel having a rubber tire bearing against the rim of said pulley and the rim of said car wheel, a frame supporting said wheel, said frame consisting of a plurality of telescoping parts, certain parts being hinged to the generator frame, the others carrying bearing members for said wheel, said bearing members being provided with holes to receive sliding bars, fixed supports for one end of said bars, and adjustable stops near the other end of said bars, coil springs surrounding said bars and bearing against said stops and said bearing members, whereby said wheel is held firmly but yieldingly against said pulley and said car wheel.

6. In combination, a wheel truck, a car body, a pivotal connection between said parts, a generator mounted in said car substantially in alinement with said connection, compensating means connecting said generator and truck, whereby said generator is driven by power derived from the rotation of said wheels, irrespective of the movement of said truck about said pivoted connection.

7. In a generator driving mechanism, a generator, a frame pivoted thereto, a driving wheel angularly movable in respect to said generator, a friction wheel mounted within said frame and means associated with said frame to maintain said friction wheel in active engagement between said generator and driving wheel in all positions.

8. In a generator driving mechanism, a generator, a frame pivoted thereto, a driving wheel having a laterally movable axis of rotation, a friction wheel mounted within said frame, and resilient means associated with said frame to maintain a constant frictional relation between said generator and driving wheel in all positions of the latter.

In witness whereof, I have hereunto subscribed my name in the presence of two witnesses.

WILLIAM L. BLISS.

Witnesses:
  Geo. B. Jones,
  F. H. Hubbard.